INVENTORS
ROBERT R. UNTERBERGER
JOHN E. WALSTROM
CLYDE T. METZ

BY
ATTORNEYS

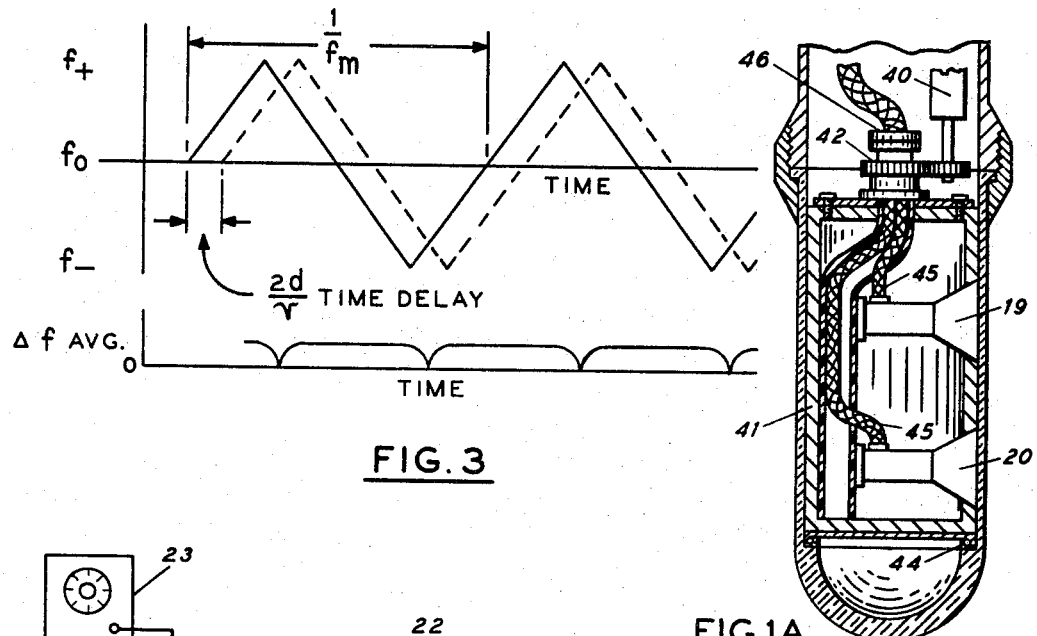

3,412,321
OIL-WATER CONTACT LOCATION WITH FREQUENCY MODULATED ELECTROMAGNETIC ENERGY
Robert R. Unterberger, Fullerton, and John E. Walstrom, Orinda, Calif., and Clyde T. Metz, New Orleans, La., assignors to Chevron Research Company, San Francisco, Calif., a corporation of Delaware
Filed Nov. 14, 1966, Ser. No. 593,768
5 Claims. (Cl. 324—6)

ABSTRACT OF THE DISCLOSURE

The oil-water contact line of an oil bearing earth formation is located relative to the well bore by positioning an electromagnetic generator in the well bore having an output signal of variable frequency within a frequency range of $10^6$ to $10^{11}$ cycles per second, and modulating the frequency of the output signal through a bandwidth of signals at a rate of repetition determined by the distance expected to be measured. After the formation has been irradiated with modulated energy, signals coming from the oil-water contact within the formation are detected and the instantaneous frequency of the transmitted and reflected signals are compared to indicate the frequency difference therebetween. The frequency difference is then converted to distance to locate the oil-water contact in the formation relative to the well bore, whether the contact lies below the bottom of the well bore or at a lateral distance from its side wall.

---

The present invention relates to a method of locating the oil-water contact in an earth formation from a well bore. More particularly, it relates to a method of finding the water-oil contact, or interface, in an earth formation by transmitting frequency modulated electromagnetic radiation through the earth formation from within the well bore and detecting simultaneously frequency differences betwen the transmitted and the received electromagnetic radiation to measure from within said well bore the distance to an oil-water contact, whether lying below the bottom of the well bore, or at a lateral distance from the side wall of the well bore.

It has been proposed to detect oil in earth formations by using electromagnetic radiation transmitters and receivers operating at certain selected frequencies either from the earth's surface or from within a well bore. For example, Potapenko Patent No. 2,139,460 proposes an electromagnetic radiation system of one or two transmitters and a receiver tuned to the transmitted frequencies. The transmitters generate radio frequency (R.F.) electromagnetic waves of two or more given frequencies, and the amplitudes of the received waves at these frequencies are compared with each other to measure their absorption by the earth formations and their contained liquids. The method is based upon the reflection or absorption of the generated waves; the amplitude of the detected signal is measured at the same frequency as a transmitted wave. While such a system is said to be suitable for certain reconnaissance type surveys—that is, where it is desired to know if there is an electromagnetic anomaly within the range of the transmitter and receiver—no attempt has been made to use radio frequency radiations to measure the distance from a fixed location within a well bore to the oil-water contact lying remotely from the well bore. Such measurement has not been proposed because of the generally accepted belief that no effective transmission of radio frequency radiations can be had through fluid containing formations around a fluid-filled borehole particularly where one, or both, of said fluids are highly conductive.

In drilling oil wells, it is common practice to use a drilling fluid to control the hydrostatic pressure of fluids contained in earth formations penetrated by the well bore. Under such drilling conditions, the pressure is always greater (hopefully) than the liquids contained in the earth formation. Accordingly, some penetration of the liquid part (called filtrate) of the drilling fluid invades the porous part of any potential oil reservoir rock. Frequently the fluid will so damage the formation that it is not possible to determine whether oil is present by previously known logging methods. The problem is most severe when the formation is relatively impermeable, say a few millidarcies, or has a porosity of less than say 5 to 10 percent. In such rocks, paradoxically, the fluid filtrate more readily penetrates the available pore space and more easily "plugs" the earth formation so that oil contained behind the mud filtrate invaded zone is difficult to produce. Furthermore, in such an environment, it is difficult to measure the presence of oil since the depth of penetration of the invading fluid may be sufficiently deep that the electrical measurements normally made are not able to distinguish them from formations that contain only water.

The problem of oil-water contact lateral to the well bore is particularly severe in fractured limestones. In such formations, the permeability is relatively low and danger of filtrate invasion and blockage of oil-bearing permeability channels are more susceptible to damage. The problem is also severe in sandstone formations that contain some shale, especially if the shale component is of the swelling variety and the well has been drilled with water-based fluid. In such an environment, the water contacting the shale portion of the sandstone tends to swell it and seal the permeability channels so that oil cannot reach the well bore. The presence of oil is not readily detectable through such a shaly sand otherwise known as a "dirty sand," in which the oil is present because the electrical resistivity measurements are not readily interpretable by usual methods.

Electric logging generally using DC or low-frequency AC has long been used to try to locate oil-water contact zones lying at a distance from a well bore. However, measurement at these frequencies made in the well bore combine the total volume of the material lying between the transmitting electrode and the detecting electrode and the surrounding volumes of drilling fluid and earth formations, including any contained fluids. Unfortunately in such a system, the lower resistivity part of any given body completely dominates the measurement so that it is difficult to identify or infer without a great deal of additional information—such as mud resistivity, characteristics of the earth formation, including permeability and lithology—the distance of an oil-water contact lying behind the well bore. Accordingly it is desired to have a better method of detecting oil-water contacts in relatively impermeable formations.

A similar problem involves drilling wells into a known petroleum-bearing formation. This is usually called "development" or "in-field" drilling (to distinguish it from "exploratory" or "wild cat" drilling). If the oil-water contact in such a known reservoir formation can be located before the well penetrates into the water, drilling can be stopped before the bottom of the well enters the water. This avoids the need to seal off the well from formation water, and is particularly desirable where the formation contains high-pressure water. If penetrated, such high-pressure water can severely limit oil production and increase water handling problems. A system for determining such an oil-water contact ahead of a borehole is an important economic goal.

It has now been discovered that, if the electromagnetic radiation is frequency modulated, the oil-water contact area of an earth formation—whether below the bottom of the well bore or at a lateral distance from its side wall—can be indicated and displayed as a function of depth from the earth's surface by electromagnetic ranging techniques. The discovery is based on the fact that, if the center frequency of the emitted radiation is rather high, say in a range of $10^6$ to $10^{11}$ hertz, and if the contact zone or area to be mapped is located relatively close to the borehole, say 1 inch to 10 feet away, the energy is not unduly attenuated or dispersed during its propagation through the formation. Accordingly, by comparing the difference in frequency between the transmitted and received energy, the distance to the oil-water contact from the well bore can be obtained and displayed as a function of depth even though the contact area may be located to the side of the borehole or below its bottom wall.

In one aspect of the present invention, the vertical oil-water contact is formed between: (1) water from a water-base drilling fluid that has invaded the formation during drilling; and (2) oil in place in an oil reservoir in the formation. It is vertical to the earth's surface and is indicated in accordance with the method of the present invention by irradiating the near side zone of the formation with FM electromagnetic energy at a plurality of mapping depths along the well bore. Because of a difference in dielectric constants between the oil in place and the water in the invaded zone of the formation, energy is reflected from the vertical contact area back to the borehole where the differences in frequency of the transmitted and received energy are detected to indicate the distance to the contact. By comparing the distances to the oil-water contact with results determined by irradiating the formation at other mapping depths (or lack of results), the oil reservoir within the formation can be identified and displayed and is vertical extent mapped in terms of depth below the earth's surface.

In another aspect of the present invention, a second oil-water contact is formed along a horizontal line between the oil in place and the original connate water of the formation. It is detected by the method of the present invention using FM electromagnetic energy radiating from a generator at a known mapping depth in a borehole preferably where the borehole has not penetrated the formation to the depth of the horizontal contact. The radiation is directed from the well bore downward into a near zone of formation below the bottom of the well bore. By analysis of the frequency differences between the transmitted and received energy, the distance from the mapping depth of the sonde to the contact can be indicated and displayed at the earth's surface, and then be utilized to indicate the depth of the oil-water contact even though the near zone formation through which the energy travels contains water. Accordingly, the oil reservoir above the contact can be penetrated to an optimum depth by the well bore without the need of sealing off the bottom segment of the well bore from the formation water.

Further objects and features of the invention will be readily apparent to those skilled in the art from the specification and appended drawings illustrating its preferred embodiments, wherein:

FIGURE 1 is a sectional view illustrating a well bore penetrating an oil reservoir of a bedded earth formation illustrating the position of an electromagnetic energy transmitting and receiving system within the well bore useful in identifying the oil reservoir by locating the oil-water contact zone formed between the oil in place and the zone invaded by the water-base drilling fluid along with associated equipment at the earth's surface above the penetrated oil reservoir;

FIGURE 3 is a waveform diagram useful in understanding the use of a frequency modulated irradiation system for ranging from a borehole in order to determine the location of the oil-water contacts of FIGURES 1 and 2; and FIGURE 4 is a schematic diagram of the transmitting and receiving system of FIGURES 1 and 2.

Figures 1, 2:
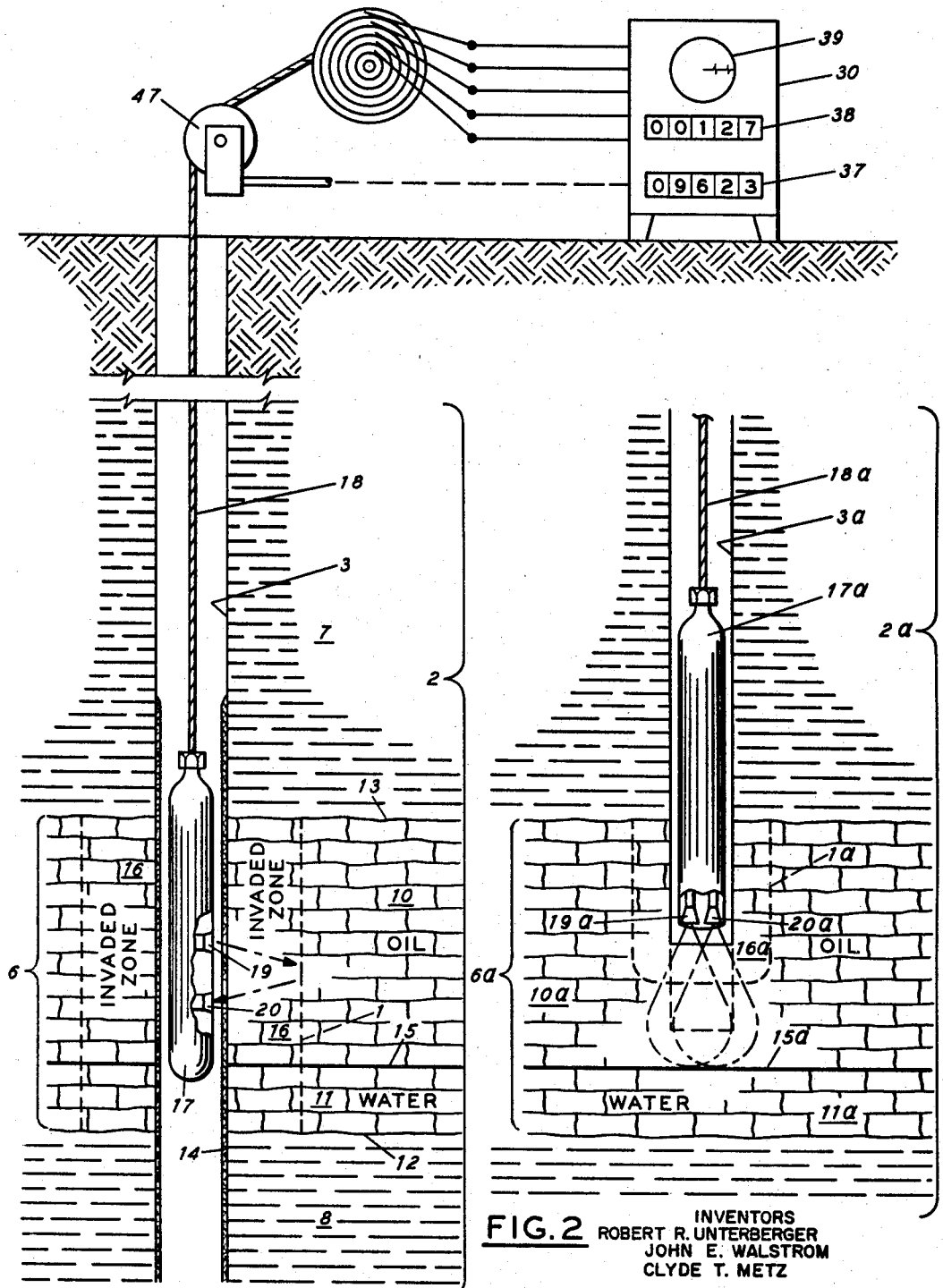
FIGURE 2 is a partial sectional view illustrating an alternative embodiment of the transmitting and receiving system of FIGURE 1 useful in locating the horizontal oil-water contact formed between the oil in place and the original connate water of an earth formation before the well bore has penetrated the contact.

Reference is now made to the drawings. In particular, FIGURE 1 illustrates use of the method of the present invention to locate vertical oil-water contact areas, indicated as line 1, in formation 2 formed between (a) water from a water-base drilling fluid that has invaded the formation 2 from well bore 3 and (b) oil in place within the formation 2. As shown, oil-water contact area 1 extends generally parallel to the side wall of well bore 3 and, although shown as marking a boundary between water in the formation due to drilling fluid invasion and oil in place in sedimentary bed 6, it also penetrates the more impermeable beds 7 and 8 adjacent to bed 6. Sedimentary bed 6 is an oil-bearing formation, such as limestone, laid down horizontally between more impervious sedimentary beds 7 and 8. The oil in place within formation bed 6 is believed to accumulate by gravity separation from other formation fluids, such as water, to form oil reservoir 10. The formation water (so-called connate water) also accumulates below the oil in place in bed 6 as reservoir water 11. The boundary between oil reservoir 10 and reservoir water 11 is along a second oil-water contact area illustrated in FIGURE 1 as horizontal line 15.

During drilling of well bore 3, drilling fluid controls the hydrostatic pressure of fluids contained in earth formation 2 penertated by the well bore. Under usual drilling conditions, the drilling fluid pressure is always greater within the well bore than in the fluids contained in the formation. Accordingly, a filter cake 14 is normally formed along the side wall of the well bore by the solid portion of the drilling fluid when the fluid portion, or filtrate, of the drilling fluid invades a porous part of the formation rock adjacent to the well bore (called the invaded zone of the formation). The invaded zone is indicated at 16 in FIGURE 1. If the oil-bearing bed 6 is relatively impermeable, say a few millidarcies, or has a porosity of less than 5 to 10 percent, paradoxically, the filtrate more readily penetrates the available pore space of invaded zone 16 and more readily "plugs" the earth formation behind it. Thus oil reservoir 10 beind the invaded zone 16 may be difficult to identify from other parts of the formation and, accordingly, may never be developed. Obviously, if the oil reservoir can be identified and its vertical extent mapped as a function of depth, channels can be opened through invaded zone 16 (by swabbing, acidizing, fracturing or perforating) with enough accuracy to penetrate oil reservoir 10 and develop its contents.

To identify the presence of oil reservoir 10 behind invaded zone 16 of sedimentary bed 6, a logging sonde 17 is supported by cable 18 within borehole 3. Within sonde 17 is a transmitting antenna 19 connected to suitable circuitry for irradiating a portion of the formation 2, in sequence, with frequency modulated electromagnetic energy. Also positioned within sonde 17 is a receiving antenna 20 also connected to suitable receiving circuitry within the sonde 17.

It is known that the energy from an antenna has maximum range, or penetration, if directed along a confined path relative to its point of origin. Accordingly, the transmitting and receiving antennas 19 and 20 are preferably of a directive type, such as the horn antennas illustrated in FIGURES 1 and 2.

Where the sonde 17 is positioned adjacent to oil reservoir 10, as illustrated in FIGURE 1, the receiving antenna 20 detects a portion of the energy reflected from vertical contact area 1. The energy is reflected because of a difference in dielectric constant between the fluids on each side of the contact area 1. By comparing instantaneous frequency the difference in those frequencies as explained below the distance to the contact area 1 can be determined and displayed at the earth's surface. This determination is based on a knowledge of the velocity of the transmitted energy in the invaded zone, and is needed to assure the operator that the echo signals are truly those signals reflected from contact area 1. The velocity of transmission of the energy can be measured from cores taken from the formation during drilling.

If bed 6 being mapped has already been determined to have the potential of containing oil as from analysis of the cores taken from the bed during drilling, or by other logging techniques, reception of reflected energy at the sonde is usually sufficient proof by itself of the presence of oil reservoir behind invaded zone 16, provided that resulting distance measurements are within the usually aceepted range of filtrate invasions, say 1 inch to 10 feet. Accordingly, by mapping the vertical extent of the contact area 1, and moreover its horizontal extent from the well bore 3, the oil reservoir 10 can be indicated and displayed with enough accuracy to allow the operator to open radial channels through invaded zone 16 to encounter oil reservoir 10.

It has been found that the depth of the penetration of the filtrate is greater in an oil-bearing bed, such as limestone bed 6, than in the more impervious formations above and below, such as beds 7 and 8. Accordingly, where the formation being mapped has not been previously determined to have an oil-bearing potential, comparison of the two-way travel time of the frequency modulated electromagnetic energy can be utilized to indicate the presence of oil-bearing rock formations, such as oil reservoir 10. In this aspect of the method of the present invention, two conditions normally present in the borehole penetrated oil-water reservoir formation are used, viz:

(1) The distance to the remote edge (the connate fluid filtrate interface) of the invaded zone in impervious beds is much less than that in a permeable, oil-bearing formation. Accordingly, after irradiation of the formation, in sequence, at mapping depths within both types of beds, the bedding interfaces marking the bed 6, say along interfaces 12 and 13 of FIGURE 1, can be indicated by the difference in the two-way travel time of the energy—and hence, distance—obtained from mapping depth adjacent to the connate fluid filtrate interface in the more impervious beds with that obtained from mapping adjacent to the oil-bearing sedimentary beds 6; and (2) The irradiated energy from sonde 17 is primarily absorbed and not reflected, when the sonde is adjacent to reservoir water 11 within the oil-bearing sedimentary bed 6. In this aspect of the present invention, the horizontal oil-water contact 15—and hence the lower boundary of oil reservoir 10—is indicated by mapping the formation at a plurality of mapping levels which include levels on either side of the contact 15. At the mapping depths, there is a contrasting effect depending upon whether the location is above or below horizontal oil-water contact line 15. Above the horizontal contact line 15, a portion of the irradiated energy is reflected from vertical oil-water contact 1 as previously described. However, below the horizontal contact line 15, the energy is not reflected from the outer edge of the invaded zone 16 since the dielectric constant of the original connate water in the formation and drilling fluid filtrate are about the same. By determing the depth where the echo signal from the vertical contact area 1 first disappears from the display and recording apparatus 30 at the earth's surface, horizontal contact 15 can be determined. This, of course, assumes that the mapping sequence begins at a depth above horizontal oil-water contact 15 and proceeds downward through the well bore first adjacent to oil reservoir 10 and then adjacent to reservoir water 11. If the mapping procedure is reversed, the depth at which the echo signals would first appear on the recording and display apparatus 30 marks the level of the horizontal contact line 15.

In some mapping applications, it has also been found that the location of vertical oil-water contact 1 may vary in azimuth at a given mapping depth. It is believed that small segments of more impervious formations, such as shale stringers, somehow intrude into the oil-bearing beds adjacent to the well bore. These stringers are more impervious to water invasion than the rest of the bed so that the vertical contact area 1 is correspondingly located closer to the well bore in this region. Obviously, if the location of the vertical contact area could be averaged in azimuth at each mapping depth, the results can be utilized more effectively to locate the oil reservoir behind the invaded zone.

FIGURE 1A illustrates suitable mechanisms for re-orienting transmitting antenna 19 and receiving antenna 20 in azimuth at each mapping depth. As shown, antenna rotor 40 connects to housing 41 through gears 42 and 43. Housing 41 is supported on bearings 44 and is fitted with openings through which the antennas extend. Energization of the antennas is by leads 45 connected to the associated circuitry in the sonde (not shown) through connector 46.

Surface-recording and display apparatus 30 for indicating the distance to the vertical oil-water contact 1 is shown in FIGURE 1 and includes three indicators: for depth, 37; for lateral distance, 38; and for azimuth, 39. Depth indicator 37 shows the depth of the sonde within the borehole. The mapping depth is measured by pulley 47; in turn, pulley 47 is connected to depth indicator 37. The lateral distance from the well bore to the vertical oil-water contact 1 at mapping depth is indicated by the difference in frequencies of the emitted and transmitted energy at the sonde 17 as explained below and by the known velocity of the energy within invaded zone 16 of the formation. Azimuthal direction of the emitted energy, if the distance to the oil-water line 1 is averaged in azimuth, may be indicated by position indicator 39, here shown as an oscilloscope, connected downhole to a sensor within rotor 40 (FIGURE 1A). By physically associating the depth indicator, the distance indicator and the azimuthal indicator, the information on all three units can be assimilated to indicate the average distance to the oil-water contact line 1 of the formation at each mapping depth. By comparing the distances to the oil-water contact line 1 within both the oil-bearing formation 10 as well as in the edge of the invaded zone in the more impervious beds above and below the oil-bearing bed, the oil reservoir 19 can be indicated and displayed as a function of depth even though the near formation through which the energy travels contains water.

FIGURE 2 illustrates a directive antenna system within sonde 17a useful in directing frequency modulated energy in a downward direction through the bottom of the borehole 3a to directly indicate the horizontal oil-water contact 15a of the oil-bearing sedimentary bed 6a. The purpose of detecting the horizontal oil-water interface 15a in a known petroleum-bearing formation is to allow the operator to penetrate the oil reservoir 10a, but stop the drilling in time so that the bottom of the well does not have to be sealed off from the formation water, such as reservoir water 11a. It is sometimes difficult to seal off wells containing high pressure water. If penetrated, such high pressure water can severely limit oil production and increase problems in separating produced water from the produced oil.

To indicate the location of horizontal contact line 15, at depth, FM energy in the aforementioned frequency range is radiated from the transmitting horn antenna 19a in the directive antenna pattern illustrated in FIGURE 2. At the horizontal oil-water contact 15a, a portion of the energy is reflected back to the receiving antenna 20a whose pattern for reception is similar to the radiating pattern of the transmitting antenna 19a. By comparing the difference in frequencies of the radiated and received signals, the distance to the horizontal contact area 15a, at depth, can be indicated and displayed at the earth's surface. By associating the known mapping depth of the sonde, as indicated by indicator 37 (FIGURE 1), and the obtained distance data, the driller-operator now has enough data to allow him to stop drilling in time not to penetrate the reservoir water 11a.

During downward radiation of the formation as illustrated in FIGURE 2, it is noted that reflections from the connate fluid-formation interface 1a near the bottom of the well are also detected by the receiving antenna 20a. But these signals can be differentiated from those from the horizontal contact 15a if a low frequency spectrum analyzer is connected to the recording and display apparatus 30 of FIGURE 1 as explained below.

Since the electromagnetic energy is transmitted through earth formations at a velocity somewhat slower than its velocity in air, the wave length of the transmitted energy is shorter in the earth formation than it is in air. In a pulsed R.F. transmission system, the time required to start and stop the pulses and to prepare the necessary receiving equipment for reception is relatively longer so that the energy travels through a suitable, say two hundred feet, lateral distance and returns to the receiver before the receiver is capable of detecting reflected signals. In accordance with the present invention, it is desired to detect the location of geological discontinuities at ranges less than two hundred feet from the borehole. It is thereafter proposed that a frequency modulated (FM) ranging system operating within the aforementioned frequency range be employed to measure these distances.

FIGURE 3 illustrates the principle of operation of such an FM ranging system. The transmitter of the FM system has a carrier frequency $f_0$ equal to at least $10^6$ but less than $10^{11}$ hertz (cycles per second) in order to propagate without undue attenuation, or distortion, within the formation even though water is present to define the location of the oil-water contact relative to the borehole. The frequency of the transmitter is varied from $f_0$ to $f+$ and $f-$, as shown, in a linear fashion but such that $f+$ is within the aforementioned frequency range. This variation can be sinusoidal, however, as it can be shown that the average frequency difference over a cycle of sinusoidal modulation is equivalent to that obtained from a linear variation within the same modulating period. One cycle of this variation is accomplished at a rate of $f_m$ hertz so that the time required to vary the energy through the full range of frequencies (one full cycle) is $1/f_m$ seconds. In the length of time that it takes to transmit energy out to the contact and for that energy to be reflected back to the formation, the frequency then being transmitted by the transmitter has changed in frequency by a certain finite amount, determined by the rate at which the transmitter's frequency is being varied.

In FIGURE 3, travel time of the wave is illustrated as a time delay and is represented by the quantity $2d/v$ where $d$ is the distance to the contact area and $v$ is the velocity of transmission of the energy through the formation 6 and is given by the equation:

$$v = \frac{c}{n} = c/\sqrt{\frac{E'}{E_0}}$$

where $c$ is the speed of light and $n$ and $E'/E_0$ are the index of refraction and the real part of the dielectric constant of the formation normalized by that of free space, respectively. The difference in frequency of the transmitted energy and the reflected energy represents the distance to the contact and back. This variation of the transmitter frequency is repeated over a number of cycles; as these two signals are beat one against the other in a suitable mixer, the resulting average difference frequency is continuously recorded to indicate the distance to the contact, whether it is below or to the side of the logging sonde. This determination is based on a knowledge of the index of refraction of the intervening formation, as determined by an analysis of cores taken from the formation during drilling of the well bore or other logging techniques.

The relationship of the difference in frequency to distance is found in the following equation:

Difference in frequency =
 rate of change of the changing frequency ×
 time between transmission and reflection $$\Delta f = R_f \times T$$

which can be written as:

$$\Delta f = \frac{B}{\frac{1}{2f_m}} \times \frac{2d}{v}$$

where:

$f_m$ = modulation rate
$B$ = band width of the frequency modulation
$d$ = lateral distance to the discontinuity, and
$v$ = the velocity of transmission in the formation which, for measurement purposes, is equal to:

$$v = c/\sqrt{\frac{E'}{E_0}}$$

where:

$c$ = speed of light in air
$E'$ = the real part of the complex dielectric constant of the intervening formation at the center frequency
$E_0$ = the real part of the complex dielectric constant of free space In accordance with the above equation, any variation in frequency of the transmitted and received energy may be directly related to distance to the discontinuity. For sandstone formations where $E'/E_0$ is 3.78, a lateral distance to the contact area of one foot away requires a time of 3.9 nanoseconds; and the difference in frequency between the transmitted and the received signal is 62.7 hertz where the modulation rate is 115 times per second and the band width (B) is 70 megahertz. Other ranges are as follows:

| Distance in Feet | Time in Nanoseconds | Frequency Difference in Hertz |
| --- | --- | --- |
| 2 | 7.8 | 125 |
| 3 | 11.8 | 188 |
| 4 | 15.6 | 250 |

To improve the near range resolution of the system, the rate of change of the changing frequency ($R_f$) can be increased by increasing the band width (B) of frequency modulation. In this regard, it has been found that the rate of change of the changing frequency ($R_f$) can be equal to about $10^6$ to $10^{11}$ hertz for detecting discontinuities spaced a distance from a few inches to several hundreds of feet from the ranging system, and preferably from about $10^9$ to $10^{11}$ for distances from about one inch to about ten feet. However, the problem of highly conductive fluids within an earth formation to be mapped by the present method is most severe in relatively permeable formations, say those in the millidarcy range, or formations having a relatively high porosity, say 20 to 40 percent. In such environment, the far range ability of the electromagnetic ranging technique for mapping the contact areas is correspondingly reduced, say from a maximum of 10 feet down to 7 feet.

FIGURE 4 illustrates a schematic diagram of a ranging system for performing the method of the present invention. In this figure, an oscillator 21 is energized by power supply 22 to generate the basic frequency for transmission into the earth formation. The oscillator may be a magnetron or klystron capable of operating at the desired frequencies and output power. A sweep generator 23 is synchronized with the oscillator and generates a varying potential at the frequency $f_m$ to cause variation of the transmitted frequency about its center frequency $f_0$. The output of the oscillator is supplied through an isolator 24 to a transmission line carrying the energy to transmitting antenna 19. Between the isolator 24 and the transmitting antenna is a directional coupler 28 for sampling the frequency of the oscillator 21. The sampled signal is supplied through attenuator 29, as one input, to balanced mixer detector 31.

As shown in FIGURE 4, receiving antenna 20 is located adjacent to the transmitting antenna and connected through a transmission line 33 to an attenuator 34. The output of attenuator 34 is applied as a second input to balanced mixer 31 where the transmitted and received signals are mixed to develop a difference frequency. This difference frequency is fed into amplifier 35. A frequency meter 36 measures the frequency of the signal from the balanced mixer and supplies that information to recording and display apparatus 30. A camera (not shown) can be utilized to photograph the distance information on distance indicator 38 from which an indication of the oil reservoir behind the invaded zone can be displayed by successive associating of a given distance to the oil-water contact areas of the formation fluids with the depth information on indicator 37. Where desired, these data can be associated, at each mapping depth, with the azimuthal direction of radiation, as determined by indicator 39. The frequency meter 36 may also include a low frequency spectrum analyzer that can resolve multiple signals being reflected from more than one contact located in the same azimuthal path, say contacts 1a and 15a of FIGURE 2, by using a narrow band amplifier with a sweeping local oscillator to identify the signals at the different frequencies.

Another form of the transmitter-receiver circuit for the FM ranging system of the present invention is indicated in phantom line in FIGURE 4 and employs a single antenna for both transmitting and receiving the electromagnetic energy to reduce the size of the downhole components of the equipment and to increase the near range resolution of the system. In accordance with this embodiment of the invention, a single antenna, say antenna 19 of FIGURE 4, can be adapted for this purpose by connecting a directional coupler 50 (shown in phantom line) in series between the antenna and attenuator 34 to supply the second input to balanced mixer detector 31. The adaptation of the horn antenna 19 for use in this manner is based on the fact that, on any transmission line, the existing electromagnetic field is, in general, considered to result from two traveling waves on the line; and these waves may be selectively sampled by directional coupling techniques, such as coupler 50, without unduly reducing the efficiency of the antenna in either its transmitting or receiving states. After the reflected signal is received by the antenna and coupled to attenuator 34, the transmitted and received signals are then beat together at the balanced mixer detector 31 to produce a difference frequency into amplifier 35 and, ultimately, to give an indication of distance to the oil-water contact, as previously described.

Another modification of the system now shown herein is the use of a horn antenna with modifications to develop circularly polarized electromagnetic energy, such as placing quarter wave plates within the body of the transmitting horn antenna. In situations where the present invention is useful, under certain conditions only circularly polarized energy can be transmitted successfully through formations having a rather high water content.

It is understood in electromagnetic arts that, when two signals of different frequencies are mixed, the combination produces four distinct signals: that is, a first signal, a second signal, a signal at the sum frequency of the two frequencies, and a signal at the difference frequency between the two frequencies. The signal of interest in the present invention is the difference frequency which detects the change in the frequency of the transmitted energy between the time it is transmitted and the time it is received. That length of time is the time taken for the electromagnetic energy to be transmitted out to the discontinuity and to return.

While certain preferred embodiments of the invention have been specifically disclosed, it should be understood that the invention is not limited thereto as many variations will be readily apparent to those skilled in the art, and the invention is to be given its broadest possible interpretation within the terms of the following claims.

We claim:

1. A method of locating an oil-water contact in an earth formation traversed by a well bore wherein the pore space of the formation surrounding the well bore is invaded by drilling fluid filtrate so as to render difficult the identification of an oil reservoir spaced from the well bore beyond said filtrate-invaded zone, which comprises positioning in said well bore an electromagnetic wave generator at a known mapping depth, said generator having an output in the frequency range of $10^6$ to $10^{11}$ hertz, irradiating the filtrate-invaded earth formation surrounding the well bore with said electromagnetic energy, varying the frequency of said generator between frequencies above and below its output frequency at a rate of between $10^6$ and $10^{11}$ hertz, simultaneously detecting in said well bore the electromagnetic energy in the transmitted band that is reflected from the oil-water contact formed between the invaded zone and said oil reservoir, comparing the instantaneous frequency of the transmitted waves with the instantaneous frequency of the received waves, detecting the frequency difference therebetween, and recording said frequency difference which can be interpreted in terms of distance to the oil reservoir in accordance with said mapping depth from said well bore, said recorded frequency difference being a measure of the distance from said well bore to the oil-water contact formed by said drilling fluid filtrate and oil in place in such oil reservoir.

2. The method in accordance with claim 1 wherein said rate of varying the frequency of said generator is from $10^9$ to $10^{11}$ hertz so that the instantaneously compared signal represents a lateral distance from the wall of the well bore to the oil-water contact of from about one inch to about ten feet.

3. The method in accordance with claim 1 in which said irradiation of said filtrate-invaded zone surrounding the well bore occurs, in sequence, at a plurality of mapping depths along said well bore so as to map the vertical extent of said oil reservoir.

4. The method in accordance with claim 3 in which the radiated electromagnetic energy is confined to an azimuthal path said path being rotated, in sequence, in azimuth at each of said mapping depths so as to accurately determine the average distance from said well bore to said contact at each of said mapping depths.

5. A method of detecting a horizontal oil-water contact between formation oil and water in a petroleum-bearing earth formation into which a well bore has penetrated but prior to the time said well bore has extended through said horizontal oil-water contact which comprises continuously generating an electromagnetic signal in the frequency range of from $10^6$ to $10^{11}$ hertz from a transmitter, transmitting said signal downwardly through the bottom of said well bore, frequency modulating said generated signal at a rate between $10^6$ and $10^{11}$ hertz, simultaneously detecting the reflected radiation from said horizontal contact over the transmitted frequency range, and comparing the instantaneous frequency of said reflected radiation with the instantaneous frequency of said generated signal, detecting the instantaneous frequency difference therebetween and recording said frequency difference as a measure of the distance from said well bore to said horizontal oil-water contact lying below the bottom of said well bore.

References Cited

UNITED STATES PATENTS

| | | | |
|---|---|---|---|
| 1,919,917 | 7/1933 | Truman | 324—6 |
| 2,139,460 | 12/1938 | Potapenko | 324—6 XR |
| 2,657,380 | 10/1953 | Donaldson | 324—6 XR |
| 3,172,075 | 3/1965 | Kay | 343—14 XR |
| 3,271,766 | 9/1966 | Nilssen | 343—14 |
| 3,286,163 | 11/1966 | Holser et al. | 324—6 |

RUDOLPH V. ROLINEC, *Primary Examiner.*

GERARD R. STRECKER, *Assistant Examiner.*